(12) United States Patent
Shannon

(10) Patent No.: US 8,480,033 B2
(45) Date of Patent: Jul. 9, 2013

(54) INTEGRAL THERMALLY INSULATED FUEL BLADDER

(75) Inventor: Robert Shannon, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 243 days.

(21) Appl. No.: 13/152,221

(22) Filed: Jun. 2, 2011

(65) Prior Publication Data

US 2012/0305711 A1    Dec. 6, 2012

(51) Int. Cl.
*B64D 37/02*    (2006.01)

(52) U.S. Cl.
USPC .................................. 244/135 B; 244/135 R

(58) Field of Classification Search
USPC .................. 244/135 R, 135 B; 220/723, 721, 220/720
See application file for complete search history.

(56) References Cited

U.S. PATENT DOCUMENTS

| | | | |
|---|---|---|---|
| 1,720,382 A | 7/1929 | Slate | |
| 2,440,965 A | 5/1948 | Merrill et al. | |
| 2,772,101 A | 11/1956 | Smith | |
| 3,122,000 A | 2/1964 | Sirocky | |
| 3,317,074 A | 5/1967 | Barker, Jr. et al. | |
| 3,330,439 A | 7/1967 | Moorman | |
| 3,787,279 A | 1/1974 | Winchester | |
| 3,979,005 A | 9/1976 | Robinson et al. | |
| 4,523,528 A * | 6/1985 | Hastings et al. | ................. 109/42 |
| 4,882,368 A | 11/1989 | Elias et al. | |
| 5,344,038 A | 9/1994 | Freeman et al. | |
| 5,755,425 A | 5/1998 | Marolda | |
| 6,360,729 B1 | 3/2002 | Ellsworth | |
| 6,719,293 B1 | 4/2004 | Coles et al. | |
| 7,119,138 B1 | 10/2006 | Feeney et al. | |
| 2007/0020497 A1 | 1/2007 | Ryoichi et al. | |
| 2007/0207186 A1 | 9/2007 | Scanlon et al. | |
| 2010/0163680 A1 | 7/2010 | Pastelak et al. | |

FOREIGN PATENT DOCUMENTS

JP    10-236172    8/1998

OTHER PUBLICATIONS

Aircraft Fuel Tanks, Aero Tech Services, retrieved from <http://www.aerotechservicesinc.com/article_fueltanks.shtml>, Jan. 12, 2011.
Hunt, et al., Systems Challenges for Hypersonic Vehicles, NASA Langley Research Center, pp. 1-18.

* cited by examiner

*Primary Examiner* — Timothy D Collins
*Assistant Examiner* — Jamie S Stehle
(74) *Attorney, Agent, or Firm* — McDermott Will & Emery LLP

(57) ABSTRACT

A method and apparatus for thermally decoupling fuel from an airframe structure is provided. In some aspects, an apparatus may include a bladder wall having stratified refractory fabric and refractory metal, and a sealant coating an internal surface of the bladder wall. The bladder wall may be configured to maintain an internal surface temperature of 300° F. or less when exposed to an external surface temperature of at least 500° F.

18 Claims, 3 Drawing Sheets

INTEGRAL THERMALLY INSULATED FUEL BLADDER

STATEMENT AS TO RIGHTS TO INVENTIONS MADE UNDER FEDERALLY SPONSORED RESEARCH OR DEVELOPMENT

This invention was made with Government support under Contract Number N00019-02-C-3002 awarded by The Department of the Air Force. The Government has certain rights in this invention.

FIELD

The present invention generally relates to a fuel bladder and, in particular, relates to an integral thermally insulated fuel bladder.

BACKGROUND

Various methods for containing fuel in an aircraft involve the use of a rigid tank. To thermal insulate cold fuel from a hot airframe structure, insulating material, typically comprising rigid insulation, is disposed on the exterior surface of a fuel tank or internal surface of the vehicle structure in the form of a thermal protection system. Application of the insulation typically requires a complex supporting structure to prevent the insulation from buckling or failing. Thermal insulation of fuel, therefore, is typically accomplished by containing the fuel in a rigid structure and applying insulating materials to the exterior of the structure. The necessity of a rigid structure inevitably increases the complexity and structural weight of the aircraft.

Alternatively, when cold fuel is disposed in a hot airframe structure without thermal decoupling, the airframe structure must be sized to accommodate the thermally induced stresses caused by the containment of the cold fuel. Accommodation of the thermally induced stresses typically requires increasing the size of the airframe structure, which inevitably increases the structural weight of the aircraft.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Various aspects of the subject technology provide a method for thermally decoupling fuel from an airframe structure by using an integral thermally insulated fuel bladder to contain the fuel within an airframe structure. By thermally decoupling the cold fuel from the hot airframe structure, thermally induced stresses in the airframe structure are reduced, thereby enabling the airframe structure to be smaller and lighter. In some aspects, the integral thermally insulated fuel bladder is flexible and thereby better able to withstand thermal loads and stresses when compared to a conventional thermally insulated rigid fuel tank.

In accordance with one aspect of the present invention, a fuel bladder for an aircraft is provided. The fuel bladder comprises a bladder wall having stratified refractory fabric and refractory metal. The fuel bladder further comprises a sealant coating an internal surface of the bladder wall, wherein the bladder wall is configured to maintain an internal surface temperature sufficient to prevent boiling of a fuel when exposed to an external surface temperature of at least 500° F.

According to another aspect of the present invention, a method for thermally decoupling fuel from an airframe structure is provided. The method comprises disposing a fuel bladder within the airframe structure. The fuel bladder comprises a bladder wall having stratified refractory fabric and refractory metal, and a sealant coating an internal surface of the bladder wall. The method further comprises exposing the bladder wall to an external surface temperature of at least 500° F., and maintaining an internal surface temperature of the bladder wall that is sufficient to prevent boiling of a fuel.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
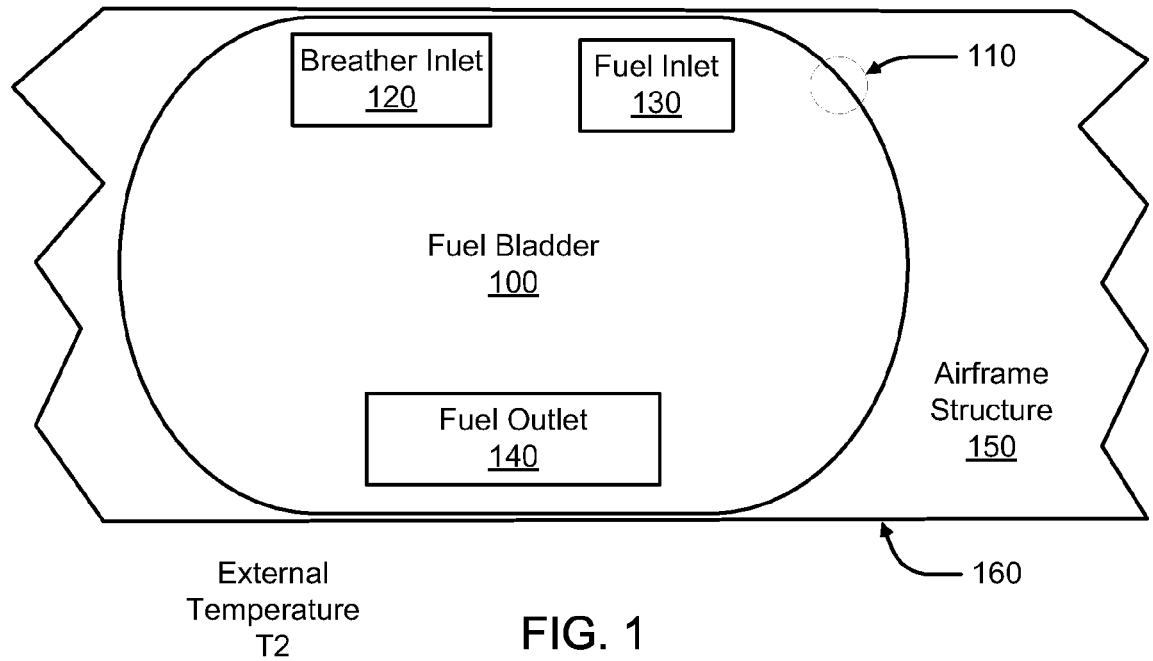
FIG. 1 is a block diagram illustrating a fuel bladder, in accordance with various aspects of the subject technology.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology. Like components are labeled with identical element numbers for ease of understanding.

Various aspects of the subject technology provide a method for thermally decoupling fuel from an airframe structure by using an integral thermally insulated fuel bladder to contain the fuel within an airframe structure. The fuel bladder comprises a bladder wall having insulation properties capable of isolating a hot airframe structure from cold fuel contained within the bladder, thereby reducing thermal gradients in the airframe structure. For example, the bladder wall may comprise stratified refractory fabric and refractory metal, internally sealed with a sealant, that enables the internal surface temperature of the bladder wall to maintain a temperature capable of preventing boiling of the fuel when exposed to external temperatures exceeding 500° F. By thermally decoupling the cold fuel from the hot airframe structure, thermally induced stresses in the airframe structure are reduced, thereby enabling the airframe structure to be smaller and lighter. The smaller and lighter airframe structure reduces the structural weight of the aircraft.

In some aspects, the integral thermally insulated fuel bladder is more effective in containing fuel than a conventional thermally insulated rigid fuel tank. The conventional fuel tank requires mechanical standoffs or flexures to thermally isolate the tank from the airframe structure and/or requires that the airframe be sized to accommodate induced thermal stresses, both of which reduce fuel capacity and increase the weight of the aircraft. In contrast, the integral thermally insulated fuel bladder is able to thermally insulate the cold fuel contained within the bladder from the airframe structure and conform to the interior volume of the structure. The integral thermally insulated fuel bladder thereby increases the volumetric efficiency of the airframe structure while reducing the structural weight of the aircraft.

Sealant applied to the inside surface of a rigid fuel tank must bridge across shear boundaries at mechanically fastened joints. The tank sealant in these areas must remain pliable and not shear when the joint flexes under load or the sealant will crack. Often, however, the sealant applied to the rigid fuel tank's joint interfaces fails in service due to the load. In some aspects, by placing the sealant on the internal surface of the integral thermally insulated fuel bladder, the sealant is isolated from the high shear areas thereby preventing failure of the sealant.

In other aspects, the integral thermally insulated fuel bladder is flexible and thereby better able to withstand thermal loads and stresses when compared to a conventional thermally insulated rigid fuel tank, which may buckle under thermal loading and stress. In some aspects, the integral thermally insulated fuel bladder is configured to be pressurized to facilitate supplying of the fuel to the aircraft and/or to compensate for external atmospheric pressures during flight. The fuel bladder may, for example, be configured to withstand an internal pressure of about 10 psi.

FIG. 1 is a block diagram illustrating a fuel bladder 100, in accordance with various aspects of the subject technology. The fuel bladder 100 is configured to contain and supply fuel for an aircraft and may be disposed within the aircraft's airframe structure 150. The fuel may, for example, comprise a hydrocarbon fuel such as jet fuel (JP-10). The airframe structure 150 may, for example, comprise the wing of a hypersonic aircraft with an outer skin 160 or other portion of the aircraft.

In one aspect, the fuel bladder 100 has a fuel inlet 130 configured to enable filling of the fuel bladder 100 with fuel. The fuel inlet 130 may, for example, comprise a valve with one end attached to the outer skin 160 of the aircraft to facilitate filling of the fuel bladder 100 with fuel. The fuel bladder 100 has a fuel outlet 140 configured to supply fuel to the aircraft. The fuel outlet 140 may, for example, comprise a valve in fluid communication with a fuel pump. The fuel bladder 100 may be configured with a breather inlet 120 for pressurizing the fuel bladder 100 during flight and/or use. The breather inlet 120 may, for example, comprise a valve configured to supply inert gas into the fuel bladder 100 to offset the volume of spent fuel in the fuel bladder 100 with the inert gas. In some aspects, the breather inlet may pressurize the fuel bladder to an internal pressure of about 10 psi.

In some aspects, the fuel bladder 100 has a bladder wall 110 configured to thermally insulate the fuel inside the fuel bladder 100 at an internal temperature T1 from an external temperature T2, where T1 is less than T2. For example, during hypersonic flight, the outer skin 160 temperature of the aircraft may reach at least 500° F. In some aspects, the fuel bladder 100 is configured to directly contact the outer skin 160 of the aircraft. Accordingly, the bladder wall 110 may reach an external surface temperature T2 of at least 500° F. In this example, the bladder wall 110 is configured to thermally insulate the fuel inside the fuel bladder 100 so that the internal surface temperature T1 of the bladder wall 110 does not exceed 300° F. Although in this example, the external surface temperature is at least 500° F., it is understood that the bladder wall 110 may be capable of thermally insulating the fuel inside the fuel bladder 100 from an external surface temperature of at least 700° F., at least 1000° F., and at least 1200° F., while maintaining an internal surface temperature T1 sufficient to prevent boiling of the fuel. In some aspects, for a fuel with a boiling temperature greater than 300° F., the internal surface temperature T1 may be 300° F. or less. In other aspects, the boiling temperature of the fuel is variable. In other aspects, the boiling temperature of the fuel may be dependent on the chemistry of the fuel and/or the pressurization of the fuel bladder 100.

Figure 2:
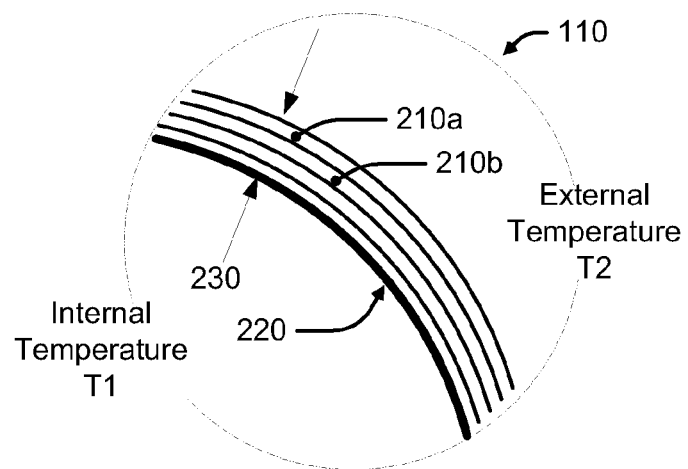
FIG. 2 illustrates a detail view of the bladder wall, in accordance with various aspects of the subject technology.

FIG. 2 illustrates a detail view of the bladder wall, in accordance with various aspects of the subject technology. The bladder wall 110 may comprise stratified refractory fabric 210a and refractory metal 210b, internally coated with a sealant 220. For example, the bladder wall 110 may comprise interleaved layers of refractory fabric 210a and refractory metal 210b, internally coated with the sealant 220. The refractory metal 210b may be disposed between adjacent layers of the refractory fabric 210a. The refractory metal 210b is used to distribute or spread thermal energy throughout the bladder wall 110, thereby facilitating distribution of the thermal load to other areas of the bladder wall 110. According to some aspects, the refractory fabric 210a and refractory metal 210b layers are stitched together with refractory fiber thread. The fuel bladder 100 may be shaped to conform to the shape of an interior space of the airframe structure. The shape of the fuel bladder 100 is achieved by utilizing tailoring techniques known by those of ordinary skill in the art.

In some aspects of the subject technology, the sealant 220 is configured to create an impermeable seal between the fuel and the bladder wall 110, preventing infiltration of external hot air and gasses into the interior of the fuel bladder 100. The sealant 220 may, for example, comprise flurosilicone. In some aspects, the bladder wall 110 has a thickness 230 between 0.20 inches to 0.30 inches. According to certain aspects, the bladder wall 110 has a density no greater than 0.050 lb/in$^3$.

Figure 3:
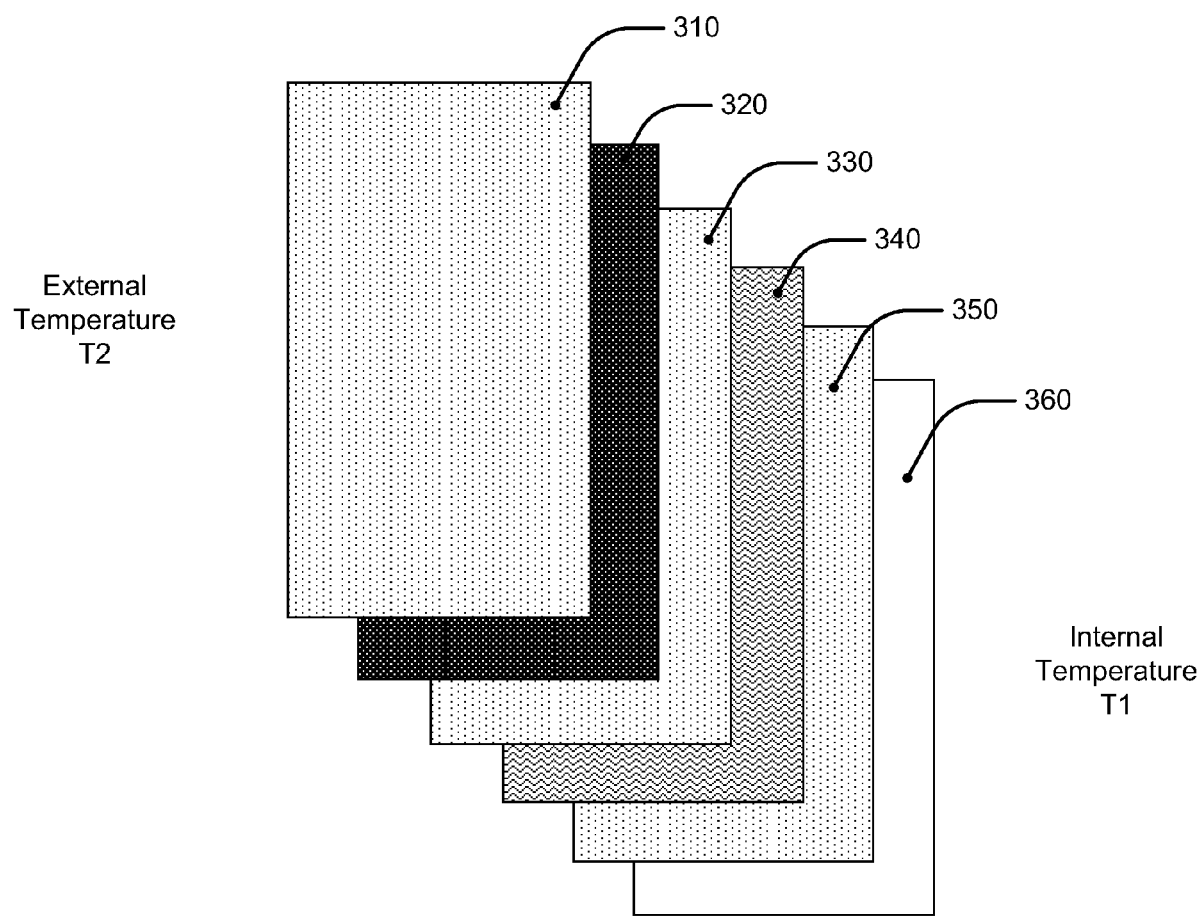
FIG. 3 shows different layers of an exemplary bladder wall, in accordance with various aspects of the subject technology.

FIG. 3 shows different layers of an exemplary bladder wall 110, in accordance with various aspects of the subject technology. The bladder wall 110 may comprise interleaved layers of refractory fabric 310, 330 and 350 and refractory metal 320 and 340, with a sealant 360 coating an interior surface of the bladder wall 110. In some aspects, the interleaved layers are arranged such that higher temperature resistant materials are disposed closer to the external surface of the bladder wall 110, while lower temperature resistance materials are disposed closer to the interior surface of the bladder wall 110. By layering the refractory fabrics and refractory metals in such an arrangement, the weight of the fuel bladder 100 and the bladder wall thickness 230 may be reduced, without compromising the overall thermal insulation properties of the fuel bladder. For a fuel with a boiling temperature greater than 300° F., the bladder wall 110 may be configured to maintain an internal surface temperature T1 of 300° F. or less even as the external surface temperature T2 exceeds 500° F., 700° F., 900° F., 1000° F., or 1200° F.

The external layer of the bladder wall 110 may be comprised of the refractory fabric 310. The refractory fabric 310 may comprise woven alumina-boria-silica fibers that retain strength, with little shrinkage, at continuous temperatures exceeding 2100° F. For example, the refractory fabric 310 may comprise a refractory textile having a high temperature limit of about 2200° F. while retaining a strength of about 40 lbs. The next layer, the refractory metal 320 may comprise a metal or alloy with a very high melting point and a relatively high density. For example, the refractory metal 320 may comprise molybdenum foil, which may have a melting point above 2200° F. In some aspects, the refractory metal 320 may distribute a localized source of thermal energy across a larger surface of the refractory metal 320, thereby facilitating distribution of the thermal energy to other areas of the bladder wall 110. The next layer, the refractory fabric 330, may comprise a refractory textile having a high temperature limit of about 2200° F. while retaining a strength of about 20 lbs. The next layer, the refractory metal 340, may comprise silica cloth with an aluminized finish having a service temperature limit of about 1800° F. The next layer, the refractory fabric 350, may comprise silica cloth with a silicone finish having a service temperature limit of about 1800° F. The internal surface of the refractory fabric 350 is coated with the sealant 360. The sealant 360 may comprise a coating, sealing, and bonding agent that is resistant to solvents and/or fuels while maintaining resiliency over a wide operating temperature range. For example, the sealant 360 may comprise a room temperature vulcanizing (RTV) fluorosilicone. Although in this example, the bladder wall 110 is composed of interleaved layers of refractory fabric 310, 330 and 350 and refractory metal 320 and 340, it is to be understood that other arrangements of refractory fabrics and refractory metals may be used to construct the bladder wall 110 to thermally insulate the fuel such that the internal surface temperature T1 does not exceed the boiling temperature of the fuel (e.g., 300° F.). Examples of other bladder wall compositions according to various aspects of the disclosure are given below.

In a first example, the bladder wall 110 comprises, from outermost layer to innermost layer, AF30-60 fabric, 21AS-36 aluminized fabric, molybdenum foil, inconel foil, and fabric coated with fluorosilicone.

In a second example, the bladder wall 110 comprises, from outermost layer to innermost layer, AF30-60 fabric, molybdenum foil, AF30-60 fabric, 21AS-36 aluminized fabric, and fabric coated with fluorosilicone.

In a third example, the bladder wall 110 comprises, from outermost layer to innermost layer, AF30-60 fabric, molybdenum foil, AF30-60 fabric, 21AS-36 aluminized fabric, 21AS-36 aluminized fabric, and 24R-36 fabric coated with fluorosilicone.

In a fourth example, the bladder wall 110 comprises, from outermost layer to innermost layer, AF30-60 fabric, molybdenum foil, AF30-60 fabric, AF30-60 fabric, 21AS-36 aluminized fabric, and 24R-36 fabric coated with fluorosilicone.

In a fifth example, the bladder wall 110 comprises, from outermost layer to innermost layer, AF30-60 fabric, molybdenum foil, AF30-60 fabric, molybdenum foil, AF30-60 fabric, AF30-60 fabric, 21AS-36 aluminized fabric, and 24R-36 fabric coated with fluorosilicone.

In a sixth example, the bladder wall 110 comprises, from outermost layer to innermost layer, AF30-60 fabric, molybdenum foil, AF30-60 fabric, molybdenum foil, AF30-60 fabric, AF30-60 fabric, aluminum foil, AF30-60 fabric, and 24R-36 fabric coated with fluorosilicone.

In a seventh example, the bladder wall 110 comprises, from outermost layer to innermost layer, AF30-60 fabric, molybdenum foil, AF30-60 fabric, molybdenum foil, AF30-60 fabric, aluminum foil, AF30-60 fabric, 21AS-36 aluminized fabric, and 24R-36 fabric coated with fluorosilicone.

Figure 4:
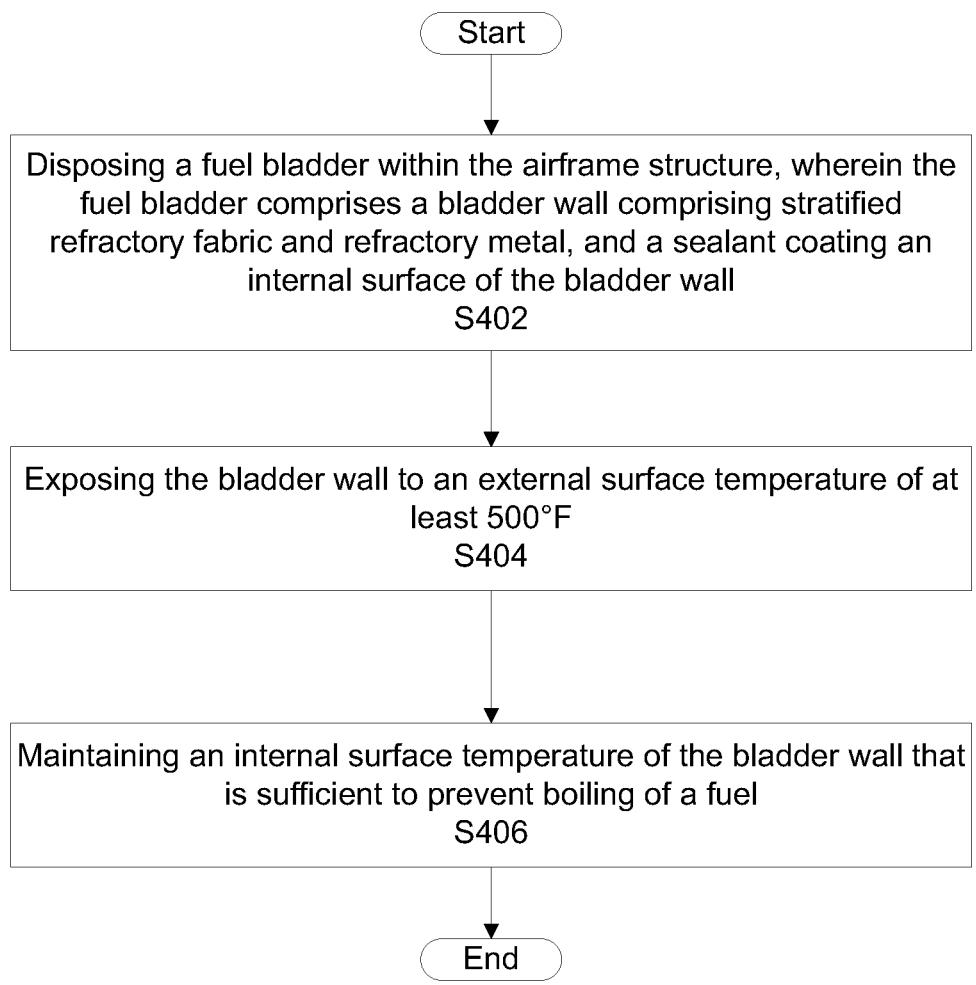
FIG. 4. illustrates an example of a method for thermally decoupling fuel from an airframe structure, in accordance with various aspects of the subject technology.

FIG. 4. illustrates an example of a method 400 for thermally decoupling fuel from an airframe structure, in accordance with various aspects of the subject technology. Method 400 comprises disposing a fuel bladder within the airframe structure, wherein the fuel bladder comprises a bladder wall comprising stratified refractory fabric and refractory metal, and a sealant coating an internal surface of the bladder wall (S402). The method further comprises exposing the bladder wall to an external surface temperature of at least 500° F. (S404), and maintaining an internal surface temperature of the bladder wall that is sufficient to prevent boiling of a fuel (S406).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A fuel bladder on an aircraft comprising:
    a bladder wall comprising stratified refractory fabric and refractory metal; and
    a sealant coating an internal surface of the bladder wall,
    wherein the bladder wall is configured to maintain an internal surface temperature sufficient to prevent boiling of a fuel when exposed to an external surface temperature of at least 500° F.

2. The fuel bladder of claim 1, wherein the fuel bladder is configured to be disposed within an airframe structure of the aircraft.

3. The fuel bladder of claim 1, wherein the internal surface temperature sufficient to prevent boiling of a fuel is 300° F. or less.

4. The fuel bladder of claim 1, wherein the external surface temperature is at least 700° F.

5. The fuel bladder of claim 1, wherein the external surface temperature is at least 1000° F.

6. The fuel bladder of claim 1, wherein the external surface temperature is at least 1200° F.

7. The fuel bladder of claim 1, wherein the bladder wall has a density no greater than 0.050 lb/in$^3$.

8. The fuel bladder of claim 1, wherein the bladder wall has a thickness between 0.20 in. to 0.30 in.

9. The fuel bladder of claim 1, wherein the sealant comprises fluorosilicone.

10. The fuel bladder of claim 1, wherein the fuel bladder has a shape conforming to an internal space within the airframe.

11. A method for thermally decoupling fuel from an airframe structure, the method comprising:
    disposing a fuel bladder within the airframe structure, wherein the fuel bladder comprises a bladder wall comprising stratified refractory fabric and refractory metal, and a sealant coating an internal surface of the bladder wall;
    exposing the bladder wall to an external surface temperature of at least 500° F.; and
    maintaining an internal surface temperature of the bladder wall that is sufficient to prevent boiling of a fuel.

12. The method of claim 11, wherein the internal surface temperature of the bladder wall is 300° F. or less.

13. The method of claim 11, wherein the external surface temperature is at least 700° F.

14. The method of claim 11, wherein the external surface temperature is at least 1000° F.

15. The method of claim 11, wherein the external surface temperature is at least 1200° F.

16. The method of claim 11, wherein the bladder wall has a density no greater than 0.050 lb/in$^3$.

17. The method of claim 11, wherein the bladder wall has a thickness between 0.20 in. to 0.30 in.

18. The method of claim 11, wherein the sealant comprises fluorosilicone.

* * * * *